US010482670B2

(12) United States Patent
Jiang et al.

(10) Patent No.: US 10,482,670 B2
(45) Date of Patent: *Nov. 19, 2019

(54) METHOD FOR REPRODUCING OBJECT IN 3D SCENE AND VIRTUAL REALITY HEAD-MOUNTED DEVICE

(71) Applicant: Qingdao GoerTek Technology Co., Ltd., Qingdao (CN)

(72) Inventors: Maoshan Jiang, Qingdao (CN); Xiangjun Zhang, Qingdao (CN); Hongwei Zhou, Qingdao (CN)

(73) Assignee: QINGDAO GOERTEK TECHNOLOGY CO., LTD., Qingdao (CN)

(*) Notice: Subject to any disclaimer, the term of this patent is extended or adjusted under 35 U.S.C. 154(b) by 0 days.

This patent is subject to a terminal disclaimer.

(21) Appl. No.: 15/808,151

(22) Filed: Nov. 9, 2017

(65) Prior Publication Data

US 2018/0075661 A1     Mar. 15, 2018

Related U.S. Application Data

(63) Continuation-in-part of application No. 15/313,446, filed as application No. PCT/CN2015/090531 on Sep. (Continued)

(30) Foreign Application Priority Data

Dec. 30, 2014    (CN) .......................... 2014 1 0842158
Dec. 30, 2014    (CN) .......................... 2014 1 0842257

(51) Int. Cl.
*G06T 19/00*      (2011.01)
*G06T 7/246*      (2017.01)
(Continued)

(52) U.S. Cl.
CPC ............ *G06T 19/006* (2013.01); *G06F 3/011* (2013.01); *G06F 3/017* (2013.01);
(Continued)

(58) Field of Classification Search
None
See application file for complete search history.

(56) References Cited

U.S. PATENT DOCUMENTS

2002/0028001 A1    3/2002   Doi et al.
2010/0241998 A1*   9/2010   Latta ....................... G06F 3/011
                                                        715/862

(Continued)

FOREIGN PATENT DOCUMENTS

CN        1648840 A     8/2005
CN        1747559 A     3/2006
(Continued)

OTHER PUBLICATIONS

Steinicke et al., "Poster: A Virtual Body for Augmented Virtuality by Chroma-Keying of Egocenteric Videos", US, 2009. (Year: 2009).*

(Continued)

*Primary Examiner* — Nicholas R Wilson
(74) *Attorney, Agent, or Firm* — Moser Taboada

(57) ABSTRACT

The present disclosure discloses a method for reproducing an object in a 3D scene and a virtual reality head-mounted device. The method comprises: simultaneously gathering at least two channels of video stream data in real time at different angles for an object to be displayed by using at least two image gatherers, wherein first field angles of the image gatherers at least partially overlap in space, and the first field angles are a horizontal field angle, a vertical field angle or a diagonal field angle; identifying out a shape of the object varying in real time from the at least two channels of video stream data; according to the shape of the object varying in (Continued)

real time, obtaining a corresponding object motion trajectory; and processing the shape of the object varying in real time and the corresponding object motion trajectory into a 3D image and in real time superposition-displaying the 3D image into the 3D scene. The technical solutions of the present disclosure can reproduce the object in the 3D scene, and achieve the purpose of displaying the realistic object in the 3D scene.

14 Claims, 3 Drawing Sheets

Related U.S. Application Data 24, 2015, now Pat. No. 10,466,798, application No. 15/808,151, which is a continuation-in-part of application No. 15/313,472, filed as application No. PCT/CN2015/090529 on Sep. 24, 2015, now Pat. No. 9,842,434.

(51) Int. Cl.
*G06T 7/73* (2017.01)
*G06T 7/564* (2017.01)
*G06F 3/01* (2006.01)
*G06K 9/00* (2006.01)

(52) U.S. Cl.
CPC .......... *G06K 9/00355* (2013.01); *G06T 7/246* (2017.01); *G06T 7/564* (2017.01); *G06T 7/73* (2017.01); *G06T 2207/10016* (2013.01); *G06T 2207/30196* (2013.01); *G06T 2207/30241* (2013.01)

(56) References Cited

U.S. PATENT DOCUMENTS

| | | |
|---|---|---|
| 2012/0309532 A1 | 12/2012 | Ambrus et al. |
| 2013/0207998 A1 | 8/2013 | Aoki |
| 2013/0278503 A1 | 10/2013 | Hirata |
| 2014/0125584 A1 | 5/2014 | Xun et al. |
| 2014/0292723 A1* | 10/2014 | Suzuki ............... G06F 3/04883 345/175 |

FOREIGN PATENT DOCUMENTS

| | | |
|---|---|---|
| CN | 1017-42348 A | 6/2010 |
| CN | 102156859 A | 8/2011 |
| CN | 102184021 A | 9/2011 |
| CN | 102681651 A | 9/2012 |
| CN | 102722249 A | 10/2012 |
| CN | 103914152 A | 7/2014 |
| CN | 103927016 A | 7/2014 |
| CN | 104050859 A | 9/2014 |
| CN | 104571510 A | 4/2015 |
| CN | 104571511 A | 4/2015 |
| CN | 204463031 U | 7/2015 |
| CN | 204463032 U | 7/2015 |
| JP | H0926318 A | 1/1997 |
| JP | H11213166 A | 8/1999 |
| JP | 2012137989 A | 7/2012 |
| JP | 2013164658 A | 8/2013 |
| JP | 2014524070 A | 9/2014 |
| WO | WO-2014079729 A | 5/2014 |

OTHER PUBLICATIONS

Kanbara et al., "A Stereoscopic Video See-Through Augmented Reality System Based on Real-Time Vision Based Registration", IEEE, 2000. (Year: 2000).*
First Office Action dated Mar. 23, 2017 for Application No. 201410842158.3.
Japenese Office Action dated Jul. 26, 2017 for Application No. 2017-509026.
Japenese Office Action dated Aug. 14, 2017 for Application No. 2017-509021.
Second Office Action dated Sep. 22, 2017 for Application No. 201410842257.1.
Second Office Action dated Sep. 22, 2017 for Application No. 201410842158.3.
Japenese Office Action dated Jan. 25, 2018 for Application No. 2017-509026.
International Search Report dated Dec. 16, 2015 for PCT Application No. PCT/CN2015/090529.
Written Opinion of the International Searching Authority dated Dec. 16, 2015 for PCT Application No. PCT/CN2015/090529.
Chinese First Office Action dated Mar. 23, 2017 for Application No. 201410842257.1.
International Search Report dated Jan. 12, 2016 for PCT Application No. PCT/CN2015/090531.
Written Opinion of the International Searching Authority dated Jan. 12, 2016 for PCT Application No. PCT/CN2015/090531.

* cited by examiner

US 10,482,670 B2

METHOD FOR REPRODUCING OBJECT IN 3D SCENE AND VIRTUAL REALITY HEAD-MOUNTED DEVICE

CROSS-REFERENCE TO RELATED APPLICATIONS

This application is a Continuation-in-Part of U.S. application Ser. No. 15/313,472 filed on Nov. 22, 2016 and Ser. No. 15/313,446 filed on Nov. 22, 2016; U.S. application Ser. No. 15/313,472 is a U.S. National Phase application of the International Application No. PCT/CN2015/090531 filed on Sep. 24, 2015, which claims priority to the Chinese Patent Application No. 201410842158.3, filed on Dec. 30, 2014; U.S. application Ser. No. 15/313,446 is a U.S. National Phase application of the International Application No. PCT/CN2015/090529 filed on Sep. 24, 2015, which claims priority to the Chinese Patent Application No 201410842257.1, filed on Dec. 30, 2014; and the disclosures of each of the applications referred to hereinabove are incorporated herein by reference in their entirety.

TECHNICAL FIELD

The present disclosure relates to the technical field of virtual reality, and particularly relates to a method for reproducing an object in a 3D scene and a virtual reality head-mounted device.

BACKGROUND

In the future, the virtual reality technology will become a new breakthrough for changing people's life style. Currently, how the virtual reality technology interacts with a target in the virtual world is a great challenge to the virtual reality technology, and therefore there is still a long way for the virtual reality technology to really enter the consumer market.

SUMMARY

In a first aspect, some embodiments of the present disclosure provide a method for reproducing an object in a 3D scene, comprising:

simultaneously gathering at least two channels of video stream data in real time at different angles for an object to be displayed by using at least two image gatherers, wherein first field angles of the image gatherers at least partially overlap in space, and the first field angles are a horizontal field angle, a vertical field angle or a diagonal field angle;

identifying out a shape of the object varying in real time from the at least two channels of video stream data;

according to the shape of the object varying in real time, obtaining a corresponding object motion trajectory; and processing the shape of the object varying in real time and the corresponding object motion trajectory into a 3D image and in real time superposition-displaying the 3D image into the 3D scene.

In a second aspect, the present disclosure provides a virtual reality head-mounted device, wherein, the virtual reality head-mounted device comprises at least two image gatherers, a storage unit and at least one controlling unit;

the controlling unit is for calling a program instruction in the storage unit, to execute the following steps:

acquiring at least two channels of video stream data that are simultaneously gathered in real time at different angles for an object to be displayed from an output of the at least two image gatherers, wherein first field angles of the image gatherers at least partially overlap in space, and the first field angles are a horizontal field angle, a vertical field angle or a diagonal field angle; and the controlling unit is further for identifying out a shape of the object varying in real time from the at least two channels of video stream data;

according to the shape of the object varying in real time, obtaining a corresponding object motion trajectory; and processing the shape of the object varying in real time and the corresponding object motion trajectory into a 3D image and in real time superposition-displaying the 3D image into the 3D scene.

In a third aspect, the present disclosure provides a computer readable storage medium, having a program instruction stored thereon, wherein the program instruction when executed by a controlling unit implements the following steps:

simultaneously gathering at least two channels of video stream data in real time at different angles for an object to be displayed by using at least two image gatherers, wherein first field angles of the image gatherers at least partially overlap in space, and the first field angles are a horizontal field angle, a vertical field angle or a diagonal field angle;

identifying out a shape of the object varying in real time from the at least two channels of video stream data;

according to the shape of the object varying in real time, obtaining a corresponding object motion trajectory; and processing the shape of the object varying in real time and the corresponding object motion trajectory into a 3D image and in real time superposition-displaying the 3D image into the 3D scene.

The advantageous effects of some embodiments of the present disclosure are that: the method for reproducing an object in a 3D scene and the virtual reality head-mounted device of the present disclosure, by simultaneously gathering at least two channels of video stream data in real time at different angles for an object to be displayed, identifying out the shape of the object that has complete object information from the at least two channels of video stream data, obtaining the corresponding object motion trajectory of the shape of the object varying in real time, and processing the shape of the object varying in real time and the corresponding object motion trajectory into a 3D image and in real time superposition-displaying the 3D image into the 3D scene, achieve the purpose of displaying the realistic object in the 3D scene.

BRIEF DESCRIPTION OF THE DRAWINGS

The drawings are intended to provide a further understanding of the present disclosure, and constitute part of the description. The drawings are intended to interpret the present disclosure along with the embodiments of the present disclosure, and do not function to limit the present disclosure. In the drawings.

DETAILED DESCRIPTION

In order to make the objects, the technical solutions and the advantages of the present disclosure clearer, the embodiments of the present disclosure will be described below in further detail in conjunction with the drawings.

Figure 1:
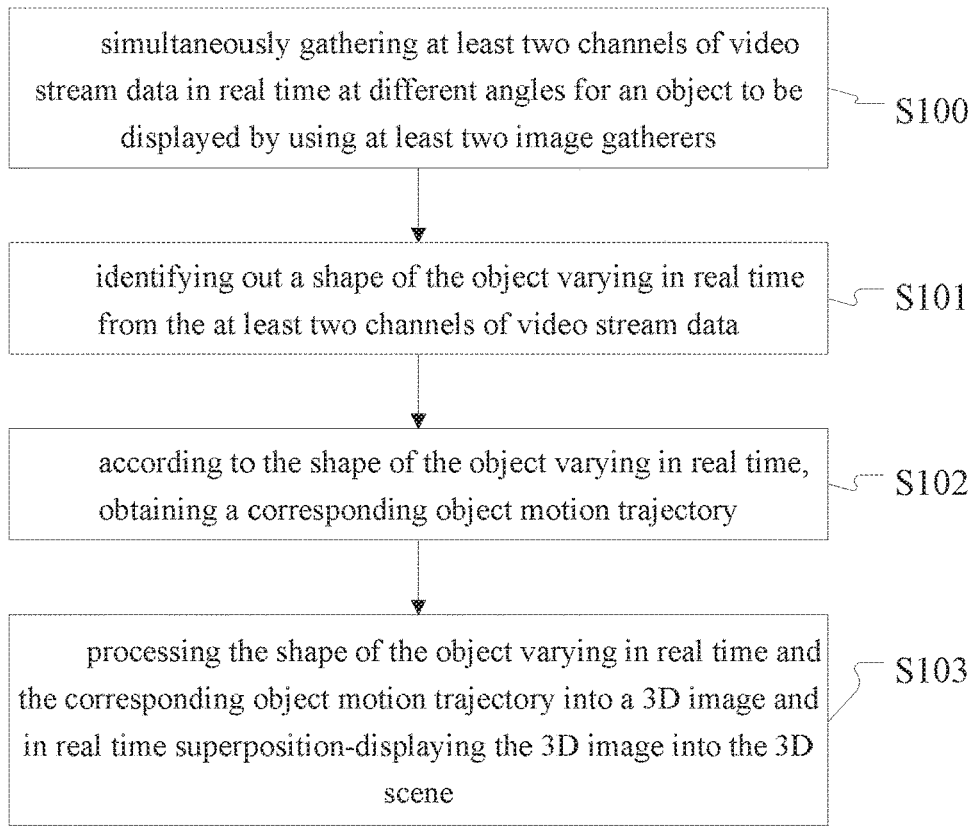
FIG. 1 is the schematic flow diagram of the method for reproducing an object in a 3D scene that is provided by some embodiments of the present disclosure.

FIG. 1 is the flow sheet of the method for reproducing an object in a 3D scene that is provided by some embodiments of the present disclosure. The method comprises:

S100, simultaneously gathering at least two channels of video stream data in real time at different angles for an object to be displayed by using at least two image gatherers, wherein first field angles of the image gatherers at least partially overlap in space, and the first field angles are a horizontal field angle, a vertical field angle or a diagonal field angle.

It should be noted that, in order to reach the effect that the object that is reproduced in the 3D scene has a depth of field, the horizontal field angles, the vertical field angles or the diagonal field angles of the image gatherers at least partially overlap in space, and the overlapping areas of the field angles of the object to be displayed that are shot by the image gatherers realize the effect of depth of field of the object.

For example, when two image gatherers are simultaneously gathering video stream data, the first field angles of the two image gatherers must have overlapping parts, and the overlapping angle is 60° to 80°.

In practical applications, the method may, according to the requirements on the data processing performance and accuracy of the system, select a suitable number of image gatherers to gather a corresponding number of channels of video stream data. The image gatherers may be white light cameras of common performance, and may also be infrared cameras, and the present embodiment does not in particular limit the image gatherers.

S101, identifying out a shape of the object varying in real time from the at least two channels of video stream data.

S102, according to the shape of the object varying in real time, obtaining a corresponding object motion trajectory.

S103, processing the shape of the object varying in real time and the corresponding object motion trajectory into a 3D image and in real time superposition-displaying the 3D image into the 3D scene.

In practical applications, the 3D image of the object is completely covered and displayed in the 3D scene, or displayed translucently in the 3D scene, and the present disclosure does not limit that.

It can be understood that, it takes time to process the gathered video stream data to finally obtain the 3D image of the object to be displayed, and generally the required duration is 45 ms, which is close to real-time displaying.

The method for reproducing an object in a 3D scene of the embodiments of the present disclosure, by simultaneously gathering at least two channels of video stream data in real time at different angles for an object to be displayed, identifying out the shape of the object that has complete object information from the at least two channels of video stream data, obtaining the corresponding object motion trajectory of the shape of the object varying in real time, and processing the shape of the object varying in real time and the corresponding object motion trajectory into a 3D image and in real time superposition-displaying the 3D image into the 3D scene, achieve the purpose of displaying the realistic object in the 3D scene. Compared with the prior art, the present disclosure does not require to redraw the object to be displayed according to the morphology of the object in a database, and can directly realistically display the gathered object images, to improve the usage experience of the user.

In some embodiments of the present disclosure, second field angles of the image gatherers at least partially overlap in space, and the second field angles comprise at least one of field angles other than the first field angles.

It can be understood that, in order that the object that is reproduced in the 3D scene has better effect of depth of field, at least two of the horizontal field angles, the vertical field angles and the diagonal field angles of the image gatherers partially overlap in space, or more than two of them partially overlap in space.

In some embodiments, the identifying out a shape of the object varying in real time from the at least two channels of video stream data comprises: performing sampling processing of each of the at least two channels of video stream data, to obtain video image data that are sampled each time; judging whether the video image data contain an object, and if so, performing binarization processing to the video image data, to extract contour information of the object; identifying out a shape of the object that is corresponding to the contour information of the object from a preset object model database; and combining shapes of the object that are identified out in each sampling of respective channels of video stream data, to obtain the shape of the object varying in real time.

Exemplarily, the above object model database saves various object models, and the object models may be hand, head or other sites of human body that have vital signs, and may also be apparatuses such as mechanic apparatuses and electronic apparatuses. At this point, a shape identifying module may identify the contour information of the object according to the various object models in the object model database, to obtain the corresponding object shape.

In practical applications, because each channel of video stream data involves part of the object, and the complete object cannot be obtained at the same time, the present embodiment combines the object shape that is identified out after each time of the sampling of the channels of video stream data, to obtain the object shape with more information.

Accordingly, the method identifies out the corresponding object shape according to the contour information of the object in the channels of video stream data, and combines the objects that have been identified out from the multiple channels of video stream data, to obtain the object shape that includes all of the information of the object, thereby enhancing the realistic effect of the object that is reproduced in the 3D scene, and improving the usage experience of the user.

In some embodiments, the according to the shape of the object varying in real time, obtaining a corresponding object motion trajectory comprises: obtaining relative spatial position information of the shape of the object varying in real time.

When the plurality of image gatherers simultaneously shoot the object at different angles, the light rays that are emitted by each of the image gatherers form an angle with the object, and if the object moves or changes, the angles that are formed by the light rays that are emitted by each of the cameras and the object will change. Further, the changes of the angles, when reflected in the video stream data, are expressed as the changes of the spatial positions. Therefore, the present technical solution acquires the relative spatial position information of the shape of the object varying in real time on the basis of that objective fact.

The method further comprises, according to contacts that are determined on the shape of the object varying in real time, obtaining variation information of the contacts on the shape of the object varying in real time, wherein the contacts are characteristic key points for identifying the object.

It should be noted that, the contacts are characteristic key points for identifying the object, and the key points are preferably the articulation points of the motion of the object, thereby better determining the shape of the object varying in real time. The present technical solution does not in particular limit the number of the contacts on the object shape and the configuration mode of the contacts, and they may be particularly designed in the designing process by comprehensively considering the requirements on the aspects such as the accuracy and the data processing capability of the system.

The method further comprises, according to the relative spatial position information and the variation information of the contacts, obtaining a corresponding object motion trajectory from a preset motion trajectory database.

In some embodiments of the present disclosure, the obtaining relative spatial position information of the shape of the object varying in real time comprises: obtaining angle information with the shape of the object varied, from video image information of the at least two channels of video stream data; obtaining distance information of the object according to the angle information with the shape of the object varied; or sensing distance information of the object in real time by a distance sensor; and according to the angle information with the shape of the object varied and the distance information of the object, obtaining the relative spatial position information of the object.

In another alternative embodiment of the present disclosure, the obtaining relative spatial position information of the shape of the object varying in real time comprises: gathering video raw data of the object, and acquiring nine-axis sensor data; and processing the video raw data and the nine-axis sensor data, to obtain relative spatial position information of the shape of the object varying in real time.

The present disclosure schematically illustrates three manners of acquiring the relative spatial position information of the shape of the object varying in real time.

In those, the first manner of obtaining the relative spatial position information of the shape of the object is:

obtaining angle information with the shape of the object varied, from video image information of the at least two channels of video stream data; and obtaining distance information of the object according to the angle information with the shape of the object varied, and obtaining the relative spatial position information of the object by referring to the angle information with the shape of the object varied and the distance information of the object.

The second manner of obtaining the relative spatial position information of the shape of the object is:

obtaining angle information with the shape of the object varied, from video image information of the at least two channels of video stream data; sensing distance information of the object in real time by a distance sensor; and obtaining the relative spatial position information of the object by referring to the angle information with the shape of the object varied and the distance information of the object.

The third manner of obtaining the relative spatial position information of the shape of the object is:

gathering video raw data of the object, and acquiring nine-axis sensor data; and processing the video raw data and the nine-axis sensor data, to obtain relative spatial position information of the shape of the object varying in real time.

Both of the above first two solutions improve the accuracy of the obtained relative spatial position information of the shape of the object by referring to the angle information with the shape of the object varied and the real-time distance information of the object. In those, the first solution can obtain the relative spatial position information of the shape of the object merely through the information provided by the video stream data, without additionally using any sensor, but an advanced algorithm is required and the system computation is more complex. However, the second solution senses the distance variation of the object in real time through a distance sensor, and can obtain the relative spatial position information of a high accuracy by merely a simple algorithm. In practical application, an appropriate solution can be selected according to the specific design requirements.

The third manner obtains the relative spatial position information of the object by using the video raw data and the nine-axis sensor data, and requires to gather and acquire the video raw data by means of a fish eye camera that is installed on the virtual reality head-mounted device, and acquire the nine-axis sensor data by means of a nine-axis sensor that is installed on the virtual reality head-mounted device. In practical applications, the nine-axis sensor integrates a three-axis magnetic sensor, a three-axis gyroscope and a three-axis accelerometer, obtains quaternions by processing the data of the three sensors, and establishes a spatial position coordinate system by using the quaternions. The position of the object is acquired and mapped by the fish eye camera into the spatial position coordinate system, and in turn the relative spatial position information of the object is acquired.

Figure 2:
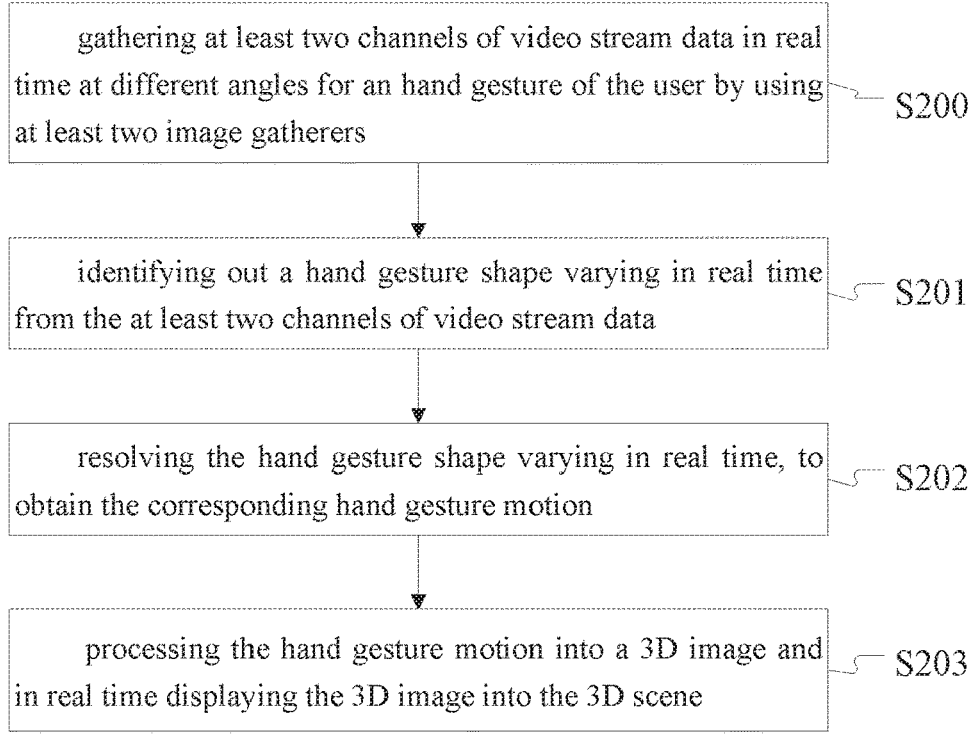
FIG. 2 is the schematic flow diagram of another method for reproducing an object in a 3D scene that is provided by some embodiments of the present disclosure.

In some embodiments, the object is a hand of the user; and correspondingly, as shown by FIG. 2, the simultaneously gathering at least two channels of video stream data in real time at different angles for an object to be displayed by using at least two image gatherers comprises:

S200, gathering at least two channels of video stream data in real time at different angles for an hand gesture of the user by using at least two image gatherers;

S201, identifying out a hand gesture shape varying in real time from the at least two channels of video stream data;

S202, resolving the hand gesture shape varying in real time, to obtain the corresponding hand gesture motion; and

S203, processing the hand gesture motion into a 3D image and in real time displaying the 3D image into the 3D scene.

The embodiments of the present disclosure achieve the purpose of displaying the realistic hand gesture of the user in the 3D scene.

In some embodiments, the method further comprises:

obtaining a hand gesture meaning of the hand gesture motion and an operation instruction that is corresponding to the hand gesture meaning from a preset meaning database; and executing the operation instruction, to control the 3D scene to conduct the operation of the hand gesture meaning.

In practical applications, the meaning database may be a data relation table, and each of the hand gesture motions corresponds to a hand gesture meaning and the operation instruction that is corresponding to the hand gesture meaning; for example, the hand gesture motions of translating may be defined as swiping the screen to switch the displayed content.

The embodiments of the present disclosure acquire the hand gesture meaning that is corresponding to a hand gesture motion and the operation instruction that is corresponding to the hand gesture meaning, to control the 3D scene to conduct the operation of the hand gesture meaning, thereby realizing the object of controlling the 3D scene by inputting hand gestures. Compared with the prior art, the present technical solution does not need a keyboard and a mouse to interact with a virtual reality device, and the interaction process is not required to restrict the user and the usage environment too much; that is, the present technical solution does not require to wear any identification mark or sensor on the body of the user, and the interaction between the user and the 3D scene is realized by the realistic hand gesture of the user, to improve the usage experience of the user.

In some embodiments, the identifying out a hand gesture shape varying in real time from the at least two channels of video stream data comprises: performing sampling processing of each of the at least two channels of video stream data, to obtain video image data that are sampled each time; judging whether the video image data contain hand information, and if so, performing binarization processing to the video image data to extract hand contour information; identifying out a shape of the hand gesture that is corresponding to the hand contour information from a preset hand gesture model database; and combining shapes of the hand gesture that are identified out in each sampling of respective channels of video stream data, to obtain the hand gesture shape varying in real time.

It should be noted that, the present disclosure can judge whether the video image data contain hand information by existing techniques. For example, the present disclosure can, by analyzing whether a video image contains information such as the characteristic shape of five fingers and the characteristic shape of a palm, judge whether the video image contains hand information.

Exemplarily, regarding the hand contour extracting, the method may, when the user uses the system for the first time, save the various hand gestures of the user (such as the hand gestures of stretching the five fingers and clenching first) into a hand gesture model database, and at this point the method may identify out the hand gesture shape that is corresponding to the hand contour information according to the hand gesture model database, which stores the realistic hand gestures of the user. Certainly, what is prestored into the hand gesture model database may also be hand form characteristics (such as the characteristics of the different states of the five fingers), and the corresponding hand gesture shape is identified out by detecting the state characteristics of the fingers in the hand contour information.

In practical applications, because each channel of video stream data involves part of the hand of the user, and the complete hand cannot be obtained at the same time, the present embodiment combines the hand gesture shape that is identified out after each time of the sampling of the channels of video stream data, to obtain the hand gesture shape with more information.

In some embodiments, the resolving the hand gesture shape varying in real time, to obtain the corresponding hand gesture motion comprises:

obtaining relative spatial position information of the hand gesture shape varying in real time; according to contacts that are determined on the hand gesture shape varying in real time, obtaining variation information of the contacts on the hand gesture shape varying in real time, wherein the contacts are characteristic key points for identifying the hand; and according to the relative spatial position information and the variation information of the contacts, obtaining a corresponding hand gesture motion from a preset motion database.

It can be understood that, when the plurality of cameras simultaneously shoot the user hand gesture, the light rays that are emitted by each of the cameras form an angle with the user hand gesture, and if the user hand gesture moves or changes, the angles that are formed by the light rays that are emitted by each of the cameras and the user hand gesture will change. Further, the changes of the angles, when reflected in the video stream image data, are expressed as the changes of the spatial positions. Therefore, the present technical solution acquires the relative spatial position information of the hand gesture shape varying in real time on the basis of that objective fact.

It should be noted that, the contacts of the present disclosure are characteristic key points for identifying the hand, and the key points are preferably the articulation points of the hand, thereby better determining the hand gesture shape varying in real time. The present technical solution does not in particular limit the number of the contacts on the hand gesture shape and the configuration mode of the contacts, and they may be particularly designed in the designing process by comprehensively considering the requirements on the aspects such as the accuracy and the data processing capability of the system.

The process of obtaining relative spatial position information of the hand gesture shape varying in real time is similar to the above process of obtaining relative spatial position information of the object shape, and will not be discussed in further detail here.

In some embodiments, the method further comprises:

acquiring spatial information of a preset range by using an infrared sensor; combining the at least two channels of video stream data, and displaying in the 3D scene the video stream data that are generated after the combining; and according to the hand gesture motion that is obtained by the resolving and the spatial information of the preset range, controlling a target in the 3D scene.

In practical applications, the method may integrally provide an infrared sensor in the fish eye camera, and acquire a spatial information of a preset range by using the infrared sensor, and the spatial information of a preset range includes the information such as the concave and convex, the heights and the distances of the objects around the hand of the user.

In practical applications, the method may provide, in the front of the virtual reality head-mounted device, a first camera and a second camera that simulate the two eyes of human being; that is, the first camera and the second camera are horizontally arranged, and have a spacing therebetween of less than 215 mm. The method may also provide, in the front of the virtual reality head-mounted device, a first camera and a second camera that are vertically arranged, and have a spacing therebetween of less than 160 mm. The method combines the two channels of video stream data that are gathered by the first camera and the second camera, and displays in the 3D scene the video stream data that are generated after the combining, to realize 3D scene displaying with two-eye cameras that has the effect of depth of field.

It should be noted that, by acquiring the spatial information of a preset range by using an infrared sensor and resolving the obtained hand gesture motion, the method can realize controlling the targets in the 3D scene by using the hand gesture that is inputted by the user. For example, the hand gesture motion that is obtained by resolving is dragging, and the 3D scene contains a desk and a cup on the desk. Accordingly, the method can, in the 3D scene, by the dragging of the hand of the user, complete the dragging of the cup on the desk, and realize the controlling on the cup on the desk.

In order to in further detail illustrate the advantageous effects of the present technical solution, a virtual reality head-mounted device is taken as the example.

The operating principle of the virtual reality head-mounted device is: gathering in real time the hand gesture of the user by using a first camera and a second camera, wherein the first field angles of the first camera and the second camera at least partially overlap in space; and obtaining two channels of video stream data, identifying out a hand gesture shape from the two channels of video stream data, obtaining the corresponding hand gesture motion by resolving the hand gesture shape, processing the hand gesture motion into a 3D image and in real time displaying the 3D image into the 3D virtual reality scene, and simultaneously sending the hand gesture meaning that is corresponding to the hand gesture motion to the controlling unit of the virtual reality head-mounted device, to control the virtual reality head-mounted device to conduct the operation of the hand gesture meaning.

Figure 3:
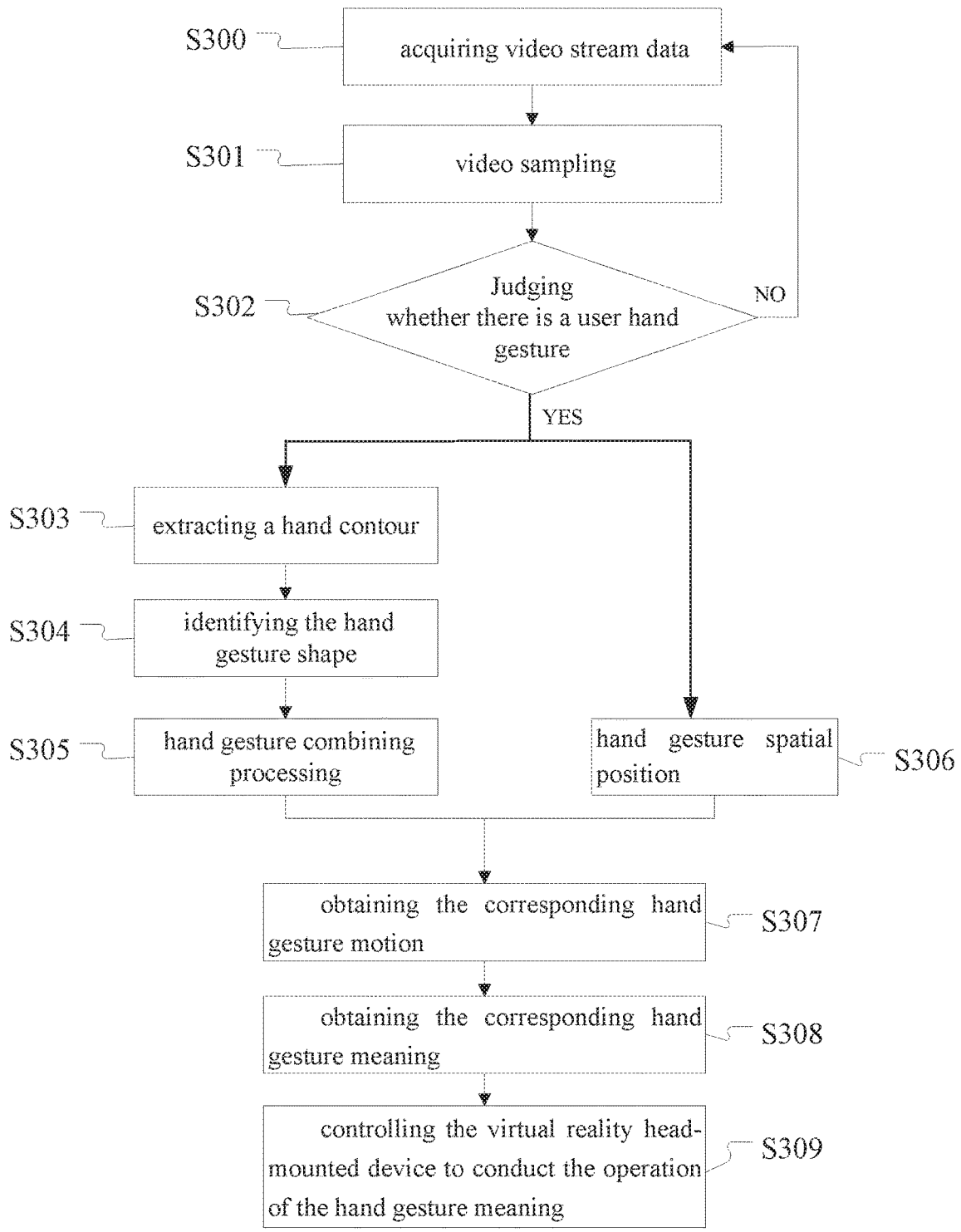
FIG. 3 is the schematic flow diagram of the technique of operating a virtual reality head-mounted device by using a hand gesture motion that is provided by some embodiments of the present disclosure.

In that, the technical flow of acquiring the hand gesture motion of the user according to the video stream data, and according to the hand gesture motion driving the virtual reality head-mounted device to conduct the corresponding operation, is as shown by FIG. 3:

S300, acquiring the video stream data that are gathered by the first camera and the second camera;

S301, conducting video sampling processing individually to the two channels of video stream data of the current moment, to obtain the corresponding video image;

S302, judging whether the video image contains a hand gesture of the user, and if yes, jumping to Step S303, and if no, acquiring the video stream data of the next moment;

S303, performing binarization processing to the video image data to extract hand contour information;

S304, according to a preset static hand gesture model, identifying out the current hand gesture shape from the hand contour information;

S305, combining the hand gesture shapes that are identified out by sampling the two channels of video stream data, to obtain the hand gesture shape with more hand information;

S306, acquiring spatial position variation information of the hand gesture;

S307, according to the hand gesture contact variation information and the hand gesture spatial position variation information, by using the HMM (Hidden Markov Model) dynamic hand gesture identification method, obtaining the corresponding hand gesture motion of the hand gesture shape varying in real time;

S308, according to the hand gesture motion obtaining the corresponding hand gesture meaning from a preset meaning database; and S309, controlling the virtual reality head-mounted device to conduct the operation of the hand gesture meaning.

The present embodiment applies the method for reproducing an user hand gesture in a 3D scene in the virtual reality head-mounted device, uses the motion of the user's own hand as the input of the virtual reality head-mounted device, and enables the user to complete the relevant operations in the virtual reality scene by his own hands, thereby improving the experience of the user, and optimizing the man machine interaction.

Figure 4:
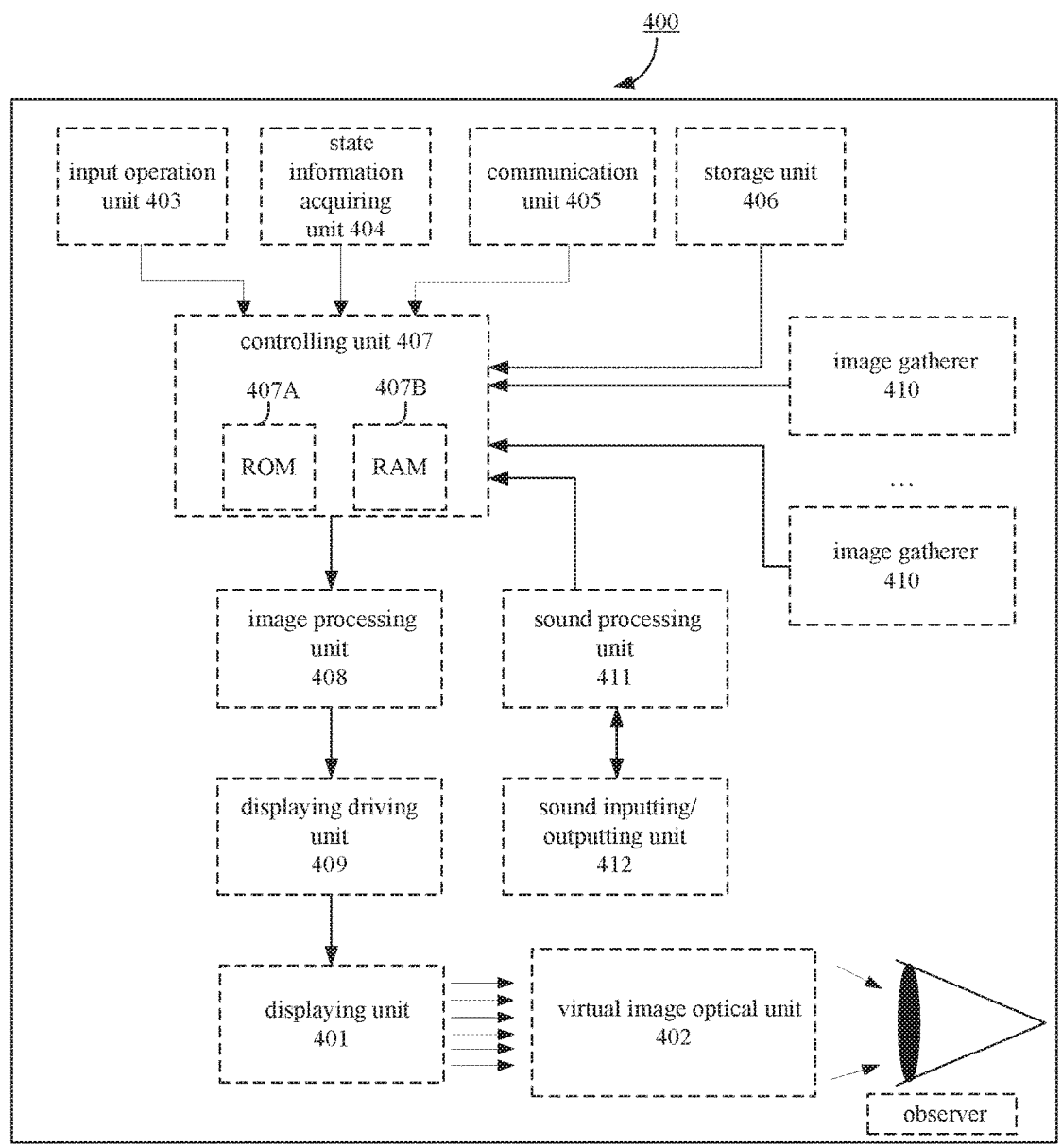
FIG. 4 is the structural schematic diagram of the virtual reality head-mounted device that is provided by some embodiments of the present disclosure.

FIG. 4 is the structural schematic diagram of the virtual reality head-mounted device 400 that is provided by the embodiments of the present disclosure. As shown by FIG. 4, the virtual reality head-mounted device 400 comprises at least two image gatherers 410, a storage unit 406 and at least one controlling unit 407;

the controlling unit 407 is for calling a program instruction in the storage unit 406, to execute the following steps:

acquiring at least two channels of video stream data that are simultaneously gathered in real time at different angles for an object to be displayed from an output of the at least two image gatherers 410, wherein first field angles of the image gatherers at least partially overlap in space, and the first field angles are a horizontal field angle, a vertical field angle or a diagonal field angle;

identifying out a shape of the object varying in real time from the at least two channels of video stream data;

according to the shape of the object varying in real time, obtaining a corresponding object motion trajectory; and processing the shape of the object varying in real time and the corresponding object motion trajectory into a 3D image and in real time superposition-displaying the 3D image into the 3D scene.

The embodiments of the present disclosure achieve the purpose of displaying the realistic object in the 3D scene. Compared with the prior art, the present disclosure does not require to redraw the object to be displayed according to the morphology of the object in a database, and can directly realistically display the gathered object images, to improve the usage experience of the user.

In practical applications, the storage unit 406 is configured to be bulk message devices that have solid state drives (SSD) and so on. In some embodiments, the storage unit 406 may store application programs or data of different types. For example, the contents that the user uses the virtual reality head-mounted device 400 to watch may be stored in the storage unit 406.

In some embodiments, second field angles of the image gatherers at least partially overlap in space, and the second field angles comprise at least one of field angles other than the first field angles.

In some embodiments, the identifying out a shape of the object varying in real time from the at least two channels of video stream data comprises: performing sampling processing of each of the at least two channels of video stream data, to obtain video image data that are sampled each time; judging whether the video image data contain the object, and if so, performing binarization processing to the video image data, to extract contour information of the object; identifying out a shape of the object that is corresponding to the contour information of the object from a preset object model database; and combining shapes of the object that are identified out in each sampling of respective channels of video stream data, to obtain the shape of the object varying in real time.

In some embodiments, the according to the shape of the object varying in real time, obtaining a corresponding object motion trajectory comprises: obtaining relative spatial position information of the shape of the object varying in real time; according to contacts that are determined on the shape of the object varying in real time, obtaining variation information of the contacts on the shape of the object varying in real time, wherein the contacts are characteristic key points for identifying the object; and according to the relative spatial position information and the variation information of the contacts, obtaining a corresponding object motion trajectory from a preset motion trajectory database.

In some embodiments, the obtaining relative spatial position information of the shape of the object varying in real time comprises: obtaining angle information with the shape of the object varied, from video image information of the at least two channels of video stream data; obtaining distance information of the object according to the angle information with the shape of the object varied; or sensing distance information of the object in real time by a distance sensor; and according to the angle information with the shape of the object varied and the distance information of the object, obtaining the relative spatial position information of the object.

In some embodiments, the device further comprises a nine-axis sensor; and the obtaining relative spatial position information of the shape of the object varying in real time comprises: gathering video raw data of the object, and acquiring nine-axis sensor data; and processing the video raw data and the nine-axis sensor data, to obtain relative spatial position information of the shape of the object varying in real time.

In some embodiments, the object is a hand of the user; and correspondingly, the controlling unit is for calling a program instruction in the storage unit, to execute the following steps:

acquiring at least two channels of video stream data that are simultaneously gathered in real time at different angles for a hand gesture of the user from outputs of the at least two image gatherers; identifying out a hand gesture shape varying in real time from the at least two channels of video stream data; resolving the hand gesture shape varying in real time, to obtain the corresponding hand gesture motion; and processing the hand gesture motion into a 3D image and in real time displaying the 3D image into the 3D scene.

In some embodiments, the program instruction further comprises:

obtaining a hand gesture meaning of the hand gesture motion and an operation instruction that is corresponding to the hand gesture meaning from a preset meaning database; and executing the operation instruction, to control the 3D scene to conduct the operation of the hand gesture meaning.

In some embodiments, the device further comprises: an infrared sensor; and the program instruction further comprises: acquiring peripheral spatial position information of the hand of the user by using the infrared sensor; combining the at least two channels of video stream data, and displaying in the 3D scene the video stream data that are generated after the combining; and according to the hand gesture motion that is obtained by the resolving and the peripheral spatial position information of the hand of the user, controlling a target in the 3D scene.

It should be noted that, the distance sensor and the nine-axis sensor of the above virtual reality head-mounted device are integrally provided in the state information acquiring unit 404. The state information acquiring unit 404 may comprise sensors of different types for detecting the state information by itself, and may acquire state information by the communication unit 405 from external devices (such as smart phones, wrist watches and other multifunctional terminals that the user wears). The state information acquiring unit 404 can acquire the position information and/or gesture information of the head of the user. The state information acquiring unit 404 may also comprise one or more of a gyroscope sensor, an acceleration sensor, a global positioning system (GPS) sensor, a terrestrial magnetism sensor, a Doppler effect sensor, and a radio-frequency field intensity sensor. Furthermore, the state information acquiring unit 404 acquires the state information of the user of the virtual reality head-mounted device 400, such as the operating state of the user (whether the user is wearing the virtual reality head-mounted device 400), the motion state of the user (such as stillness, walking, running and the like moving states, the gesture of the hand or the fingertips, the opening or closing state of the eyes, the line-of-sight direction, and the pupil size), the mental state (whether the user is being immersed in observing the displayed image and the like), or even physiological state.

In some embodiments, the virtual reality head-mounted device 400 further comprises a displaying unit 401. The displaying unit 401 may comprise a display panel. The display panel is provided on the side surface of the virtual reality head-mounted device 400 that faces the face of the user, and may be a single panel, or a left panel and a right panel that are respectively corresponding to the left eye and the right eye of the user. The display panel may be an electroluminescence (EL) element, a liquid crystal display or a micro display with the like structure, or a laser scanning display that the retina can directly display or a like laser scanning display.

In some embodiments, the virtual reality head-mounted device 400 further comprises a virtual image optical unit 402. The virtual image optical unit 402 shoots the image that is displayed by the displaying unit 401 by magnification, and allows the user to observe the displayed image according to the magnified virtual image. The displayed image that is outputted to the displaying unit 401 may be the image of the virtual scene that is provided by a content reproduction device (Bluray disc or DVD player) or a streaming media server, or the image of a realistic scene that is shot by the image gatherers 410.

In some embodiments, the virtual image optical unit 402 may comprise a lens unit, such as a spherical lens, an aspheric lens or a fresnel lens.

In some embodiments, the virtual reality head-mounted device 400 further comprises an input operation unit 403. The input operation unit 403 comprises at least one operation component for executing input operations, such as keys, buttons, switches or other components having the like functions, and by the operation component receives user instructions and outputs instructions to the controlling unit 407. It can be understood that, the user, besides triggering the operation instructions by using the input operation unit 403, can trigger the operation instructions by hand gestures.

In some embodiments, the virtual reality head-mounted device 400 further comprises the communication unit 405. The communication unit 405 executes the communication processing with external devices, modulation and demodulation processing, and the encoding and decoding processing of communication signals. In addition, the controlling unit 407 may send and transmit data from the communication unit 405 to external devices. The communication mode may be of wire form or wireless form, such as Mobile High-Definition Link (MHL) or Universal Serial Bus (USB), High Definition Multimedia Interface (HDMI), Wireless Fidelity (Wi-Fi), Bluetooth communication or low power dissipation Bluetooth communication, and mesh network of IEEE802.11s standard. In addition, the communication unit 405 may be a cellular wireless transceiver that is operated according to Wideband-Code Division Multiple Access (W-CDMA), Long Term Evolution (LTE) and similar standards.

In some embodiments, the virtual reality head-mounted device 400 further comprises an image processing unit 408 and a displaying driving unit 409. The image processing unit 408 is used for executing signal processing, for example, image quality correction relevant to the image signal that is outputted by the controlling unit 407, and converting its resolution to a resolution that is according to the screen of the displaying unit 401. Then, the displaying driving unit 409 successively selects each line of pixels of the displaying unit 401, and successively scans line by line each line of pixels of the displaying unit 401, so as to provide pixel signals on the basis of the image signals that have undergone signal processing.

In some embodiments, the virtual reality head-mounted device 400 may also comprise a sound processing unit 411. The sound processing unit 411 can execute the sound quality correction or sound amplification of the sound signals that are outputted by the controlling unit 407, and the signal processing of the inputted sound signal. Then, the sound inputting/outputting unit 412, after the sound processing, outputs the sound to exterior and inputs the sound from the microphone.

It should be noted that, the structures or components that are indicated by the dotted line blocks in FIG. 4 may be independent of the virtual reality head-mounted device 400; for example, they may be provided in an external processing system (for example, a computer system) and used with the virtual reality head-mounted device 400. Alternatively, the structures or components that are indicated by the dotted line blocks may be provided inside or on the virtual reality head-mounted device 400.

The present disclosure further provides a computer readable storage medium, having a program instruction stored thereon, wherein the program instruction when executed by a controlling unit implements the following steps:

simultaneously gathering at least two channels of video stream data in real time at different angles for an object to be displayed by using at least two image gatherers, wherein first field angles of the image gatherers at least partially overlap in space, and the first field angles are a horizontal field angle, a vertical field angle or a diagonal field angle; identifying out a shape of the object varying in real time from the at least two channels of video stream data; according to the shape of the object varying in real time, obtaining a corresponding object motion trajectory; and processing the shape of the object varying in real time and the corresponding object motion trajectory into a 3D image and in real time superposition-displaying the 3D image into the 3D scene.

In some embodiments, second field angles of the image gatherers at least partially overlap in space, and the second field angles comprise at least one of field angles other than the first field angles.

In conclusion, the method for reproducing an object in a 3D scene and the virtual reality head-mounted device that are disclosed by the embodiments of the present disclosure, by simultaneously gathering at least two channels of video stream data in real time at different angles for an object to be displayed by using at least two image gatherers, identifying out a shape of the object varying in real time from the at least two channels of video stream data; according to the shape of the object varying in real time, obtaining a corresponding object motion trajectory; and processing the shape of the object varying in real time and the corresponding object motion trajectory into a 3D image and in real time superposition-displaying the 3D image into the 3D scene, achieve the purpose of displaying the realistic object in the 3D scene. Compared with the prior art, the present disclosure does not require to redraw the object to be displayed according to the morphology of the object in a database, and can directly realistically display the gathered object images, to improve the usage experience of the user.

In addition, the technical solutions of the present disclosure, by simultaneously gathering at least two channels of video stream data in real time at different angles for the hand gesture of the user, identifying out a hand gesture shape varying in real time from the at least two channels of video stream data, resolving the hand gesture shape varying in real time, to obtain the corresponding hand gesture motion, and processing the hand gesture motion into a 3D image and in real time displaying the 3D image into the 3D scene, achieve the purpose of displaying the realistic hand gesture of the user in the 3D scene.

The preferable technical solutions of the present disclosure process the hand gesture motions, generate the corresponding hand gesture meaning, and enable the 3D scene to correspondingly operate according to the hand gesture meaning, thereby realizing the object of controlling the 3D scene by inputting hand gestures. Compared with the prior art, the present technical solution does not need a keyboard and a mouse to interact with a virtual reality device, and the interaction process is not required to restrict the user and the usage environment too much; that is, the present technical solution does not require to wear any identification mark or sensor on the body of the user, and the interaction between the user and the 3D scene is realized by the realistic hand gesture of the user, to improve the usage experience of the user.

The above descriptions are merely preferable embodiments of the present disclosure, and are not limiting the protection scope of the present disclosure. Any modifications, equivalent substitutions or improvements that are made within the spirit and principle of the present disclosure are all included in the protection scope of the present disclosure.

The invention claimed is:

1. A method for reproducing an object in a 3D scene, wherein the method comprises:
   simultaneously gathering at least two channels of video stream data in real time at different angles for an object to be displayed by using at least two image gatherers, wherein first field angles of the image gatherers at least partially overlap in space, and the first field angles are a horizontal field angle, a vertical field angle or a diagonal field angle;
   identifying out a shape of the object varying in real time from the at least two channels of video stream data;
   according to the shape of the object varying in real time, obtaining a corresponding object motion trajectory; and
   processing the shape of the object varying in real time and the corresponding object motion trajectory into a 3D image and in real time superposition-displaying the 3D image into the 3D scene;
   wherein the identifying out a shape of the object varying in real time from the at least two channels of video stream data comprises:
   performing sampling processing of each of the at least two channels of video stream data, to obtain video image data that are sampled each time;
   judging whether the video image data contain an object, and if so, performing binarization processing to the video image data, to extract contour information of the object;
   identifying out a shape of the object that is corresponding to the contour information of the object from a preset object model database; and
   combining shapes of the object that are identified out in each sampling of respective channels of video stream data, to obtain the shape of the object varying in real time;

wherein the according to the shape of the object varying in real time, obtaining a corresponding object motion trajectory comprises:

obtaining relative spatial position information of the shape of the object varying in real time:

according to contacts that are determined on the shape of the object varying in real time, obtaining variation information of the contacts on the shape of the object varying in real time, wherein the contacts are characteristic key points for identifying the object; and according to the relative spatial position information and the variation information of the contacts, obtaining a corresponding object motion trajectory from a preset motion trajectory database; and wherein the obtaining relative spatial position information of the shape of the object varying in real time comprises:

obtaining angle information with the shape of the object varied, from video image information of the at least two channels of video stream data;

obtaining distance information of the object according to the angle information with the shape of the object varied; or sensing distance information of the object in real time by a distance sensor; and according to the angle information with the shape of the object varied and the distance information of the object, obtaining the relative spatial position information of the object.

2. The method according to claim 1, wherein second field angles of the image gatherers at least partially overlap in space, and the second field angles comprise at least one of field angles other than the first field angles.

3. The method according to claim 1, wherein the obtaining relative spatial position information of the shape of the object varying in real time comprises:

gathering video raw data of the object, and acquiring nine-axis sensor data; and processing the video raw data and the nine-axis sensor data, to obtain relative spatial position information of the shape of the object varying in real time.

4. The method according to claim 1, wherein the object is a hand of the user; and correspondingly, the simultaneously gathering at least two channels of video stream data in real time at different angles for an object to be displayed by using at least two image gatherers comprises: gathering at least two channels of video stream data in real time at different angles for an hand gesture of the user by using at least two image gatherers;

the identifying out a shape of the object varying in real time from the at least two channels of video stream data comprises: identifying out a hand gesture shape varying in real time from the at least two channels of video stream data;

the according to the shape of the object varying in real time, obtaining a corresponding object motion trajectory comprises: resolving the hand gesture shape varying in real time, to obtain the corresponding hand gesture motion; and the processing the shape of the object varying in real time and the corresponding object motion trajectory into a 3D image and in real time superposition-displaying the 3D image into the 3D scene comprises:

processing the hand gesture motion into a 3D image and in real time displaying the 3D image into the 3D scene.

5. The method according to claim 4, wherein the method further comprises:

obtaining a hand gesture meaning of the hand gesture motion and an operation instruction that is corresponding to the hand gesture meaning from a preset meaning database; and executing the operation instruction, to control the 3D scene to conduct the operation of the hand gesture meaning.

6. The method according to claim 4, wherein the method further comprises:

acquiring spatial information of a preset range by using an infrared sensor;

combining the at least two channels of video stream data, and displaying in the 3D scene the video stream data that are generated after the combining; and according to the hand gesture motion that is obtained by the resolving and the spatial information of the preset range, controlling a target in the 3D scene.

7. A virtual reality head-mounted device, wherein the virtual reality head-mounted device comprises at least two image gatherers, a memory storing an instruction and at least one processor, wherein the at least one processor executes the following operations according to the instruction stored on the memory:

acquiring at least two channels of video stream data that are simultaneously gathered in real time at different angles for an object to be displayed from an output of the at least two image gatherers, wherein first field angles of the image gatherers at least partially overlap in space, and the first field angles are a horizontal field angle, a vertical field angle or a diagonal field angle;

identifying out a shape of the object varying in real time from the at least two channels of video stream data;

according to the shape of the object varying in real time, obtaining a corresponding object motion trajectory; and processing the shape of the object varying in real time and the corresponding object motion trajectory into a 3D image and in real time superposition-displaying the 3D image into the 3D scene;

wherein the identifying out a shape of the object varying in real time from the at least two channels of video stream data comprises:

performing sampling processing of each of the at least two channels of video stream data, to obtain video image data that are sampled each time;

judging whether the video image data contain the object, and if so, performing binarization processing to the video image data, to extract contour information of the object;

identifying out a shape of the object that is corresponding to the contour information of the object from a preset object model database; and combining shapes of the object that are identified out in each sampling of respective channels of video stream data, to obtain the shape of the object varying in real time;

wherein the according to the shape of the object varying in real time, obtaining a corresponding object motion trajectory comprises:

obtaining relative spatial position information of the shape of the object varying in real time;

according to contacts that are determined on the shape of the object varying in real time, obtaining variation information of the contacts on the shape of the object varying in real time, wherein the contacts are characteristic key points for identifying the object; and according to the relative spatial position information and the variation information of the contacts, obtaining a corresponding object motion trajectory from a preset motion trajectory database; and wherein the obtaining relative spatial position information of the shape of the object varying in real time comprises:

obtaining angle information with the shape of the object varied, from video image information of the at least two channels of video stream data;

obtaining distance information of the object according to the angle information with the shape of the object varied; or sensing distance information of the object in real time by a distance sensor; and according to the angle information with the shape of the object varied and the distance information of the object, obtaining the relative spatial position information of the object.

8. The device according to claim 7, wherein second field angles of the image gatherers at least partially overlap in space, and the second field angles comprise at least one of field angles other than the first field angles.

9. The device according to 7, wherein the device further comprises a nine-axis sensor; and the obtaining relative spatial position information of the shape of the object varying in real time comprises:

gathering video raw data of the object, and acquiring nine-axis sensor data; and processing the video raw data and the nine-axis sensor data, to obtain relative spatial position information of the shape of the object varying in real time.

10. The device according to claim 7, wherein the object is a hand of the user; and the operations comprise:

acquiring at least two channels of video stream data that are simultaneously gathered in real time at different angles for a hand gesture of the user from outputs of the at least two image gatherers;

identifying out a hand gesture shape varying in real time from the at least two channels of video stream data;

resolving the hand gesture shape varying in real time, to obtain the corresponding hand gesture motion; and processing the hand gesture motion into a 3D image and in real time displaying the 3D image into the 3D scene.

11. The device according to claim 10, wherein the operations further comprise:

obtaining a hand gesture meaning of the hand gesture motion and an operation instruction that is corresponding to the hand gesture meaning from a preset meaning database; and executing the operation instruction, to control the 3D scene to conduct the operation of the hand gesture meaning.

12. The device according to claim 10, wherein the device further comprises: an infrared sensor; and the operations further comprise:

acquiring peripheral spatial position information of the hand of the user by using the infrared sensor;

combining the at least two channels of video stream data, and displaying in the 3D scene the video stream data that are generated after the combining; and according to the hand gesture motion that is obtained by the resolving and the peripheral spatial position information of the hand of the user, controlling a target in the 3D scene.

13. A non-transitory computer readable storage medium, having a program instruction stored thereon, wherein the program instruction when executed by a controlling unit implements the following steps:

simultaneously gathering at least two channels of video stream data in real time at different angles for an object to be displayed by using at least two image gatherers, wherein first field angles of the image gatherers at least partially overlap in space, and the first field angles are a horizontal field angle, a vertical field angle or a diagonal field angle;

identifying out a shape of the object varying in real time from the at least two channels of video stream data;

according to the shape of the object varying in real time, obtaining a corresponding object motion trajectory; and processing the shape of the object varying in real time and the corresponding object motion trajectory into a 3D image and in real time superposition-displaying the 3D image into the 3D scene;

wherein the identifying out a shape of the object varying in real time from the at least two channels of video stream data comprises:

performing sampling processing of each of the at least two channels of video stream data, to obtain video image data that are sampled each time;

judging whether the video image data contain an object, and if so, performing binarization processing to the video image data, to extract contour information of the object;

identifying out a shape of the object that is corresponding to the contour information of the object from a preset object model database; and combining shapes of the object that are identified out in each sampling of respective channels of video stream data, to obtain the shape of the object varying in real time;

wherein the according to the shape of the object varying in real time, obtaining a corresponding object motion trajectory comprises:

obtaining relative spatial position information of the shape of the object varying in real time;

according to contacts that are determined on the shape of the object varying in real time, obtaining variation information of the contacts on the shape of the object varying in real time, wherein the contacts are characteristic key points for identifying the object; and according to the relative spatial position information and the variation information of the contacts, obtaining a corresponding object motion trajectory from a preset motion trajectory database; and wherein the obtaining relative spatial position information of the shape of the object varying in real time comprises:

obtaining angle information with the shape of the object varied, from video image information of the at least two channels of video stream data;

obtaining distance information of the object according to the angle information with the shape of the object varied; or sensing distance information of the object in real time by a distance sensor; and according to the angle information with the shape of the object varied and the distance information of the object, obtaining the relative spatial position information of the object.

14. The non-transitory computer readable storage medium according to claim 13, wherein second field angles of the image gatherers at least partially overlap in space, and the second field angles comprise at least one of field angles other than the first field angles.

* * * * *